Aug. 7, 1934.                J. GOBIN, DIT DAUDÉ                1,969,214
                              RIVETING MACHINE
                       Filed Aug. 15, 1932      7 Sheets-Sheet 1
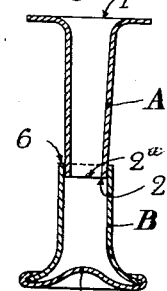
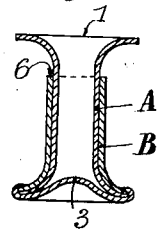
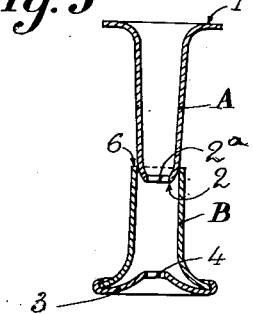
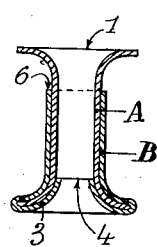
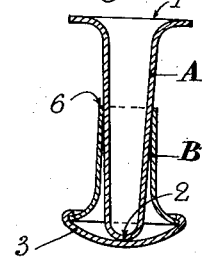
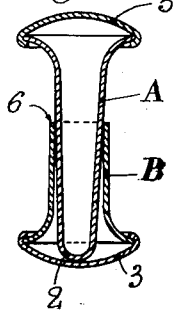
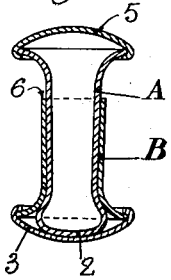
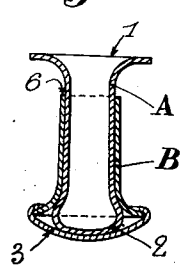
J. Gobin dit Daudé
    INVENTOR
By: Marks & Clerk
            Attys.

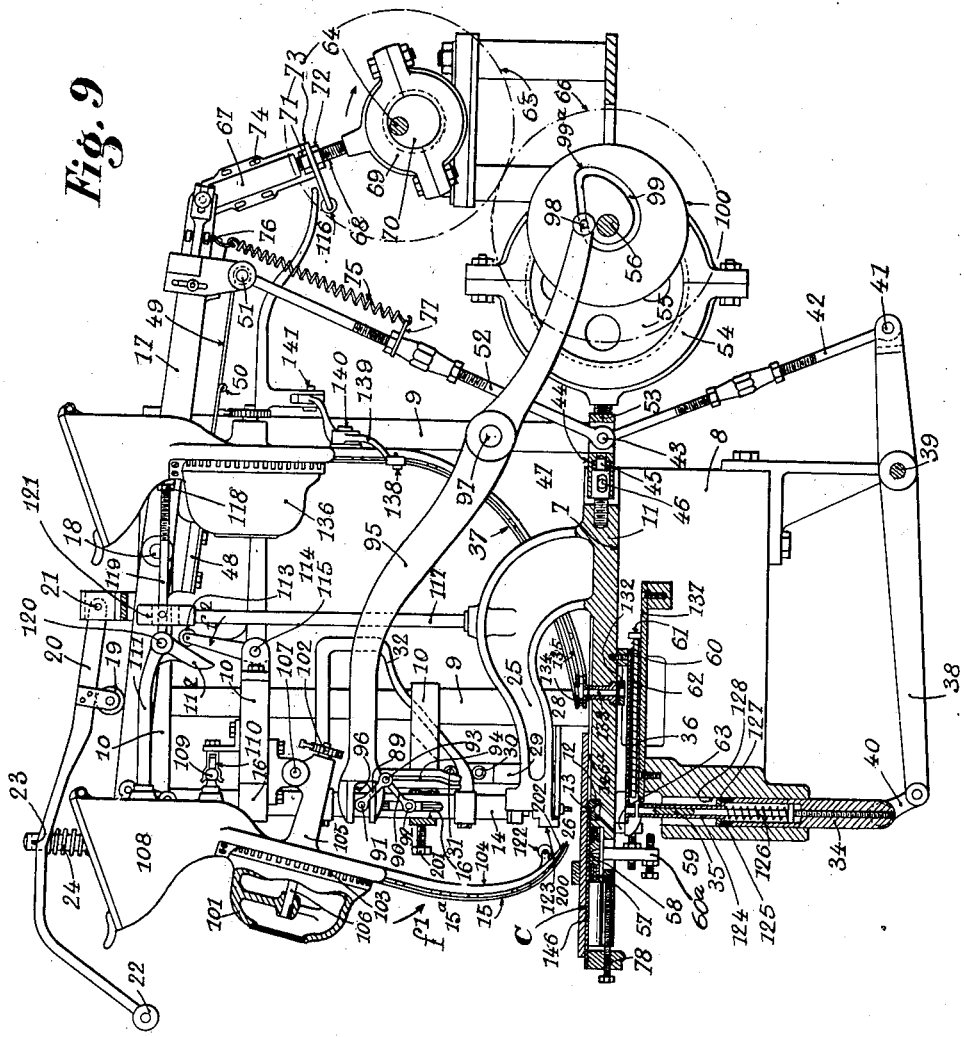

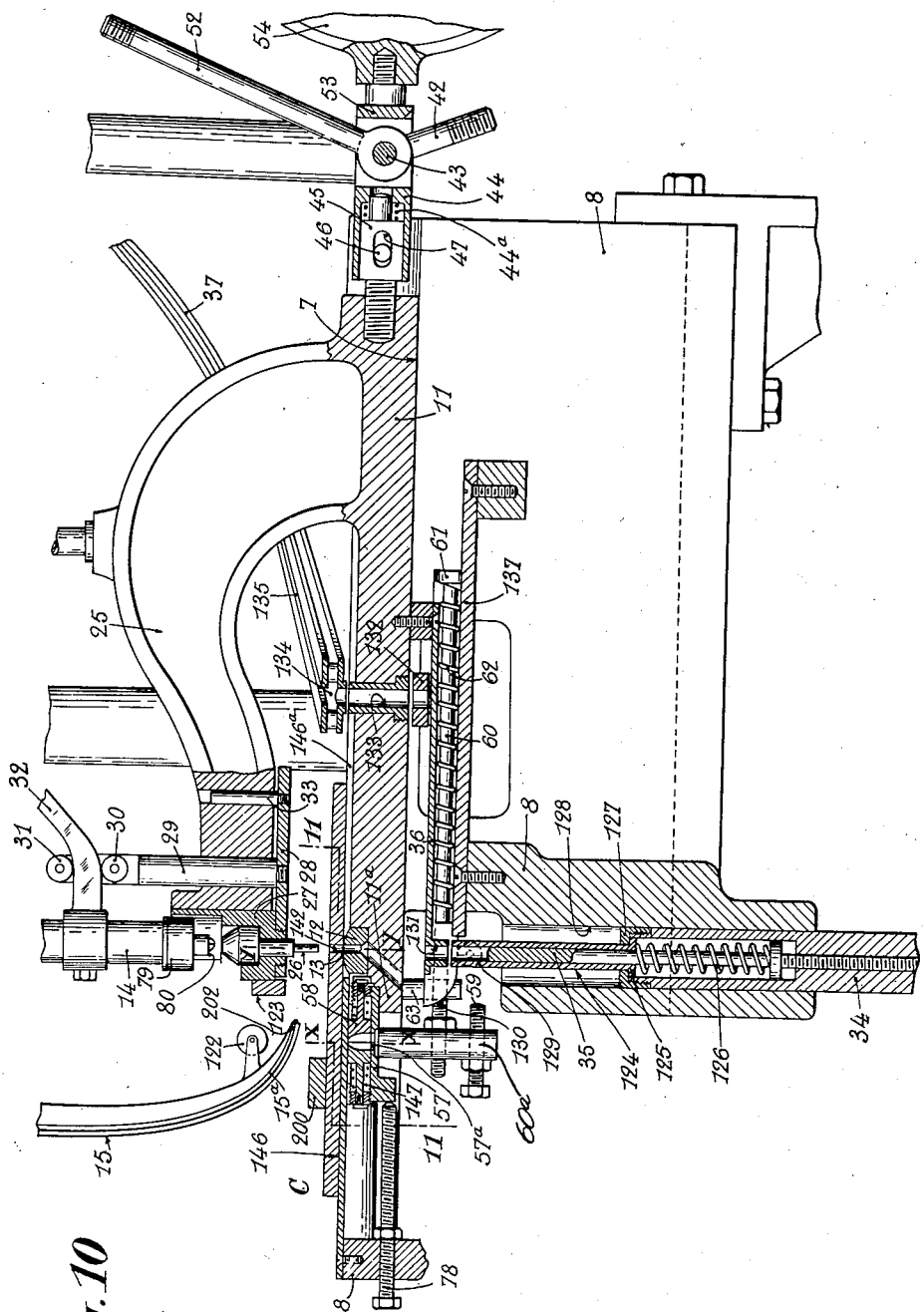

Aug. 7, 1934.  J. GOBIN, DIT DAUDÉ  1,969,214
RIVETING MACHINE
Filed Aug. 15, 1932  7 Sheets-Sheet 4

J. Gobin dit Daudé
INVENTOR

By Marks & Clerk
Attys.

Aug. 7, 1934.　　　J. GOBIN, DIT DAUDÉ　　　1,969,214
RIVETING MACHINE
Filed Aug. 15, 1932　　7 Sheets-Sheet 5

J. Gobin dit Daudé
INVENTOR

By: Marks & Clerk
Attys.

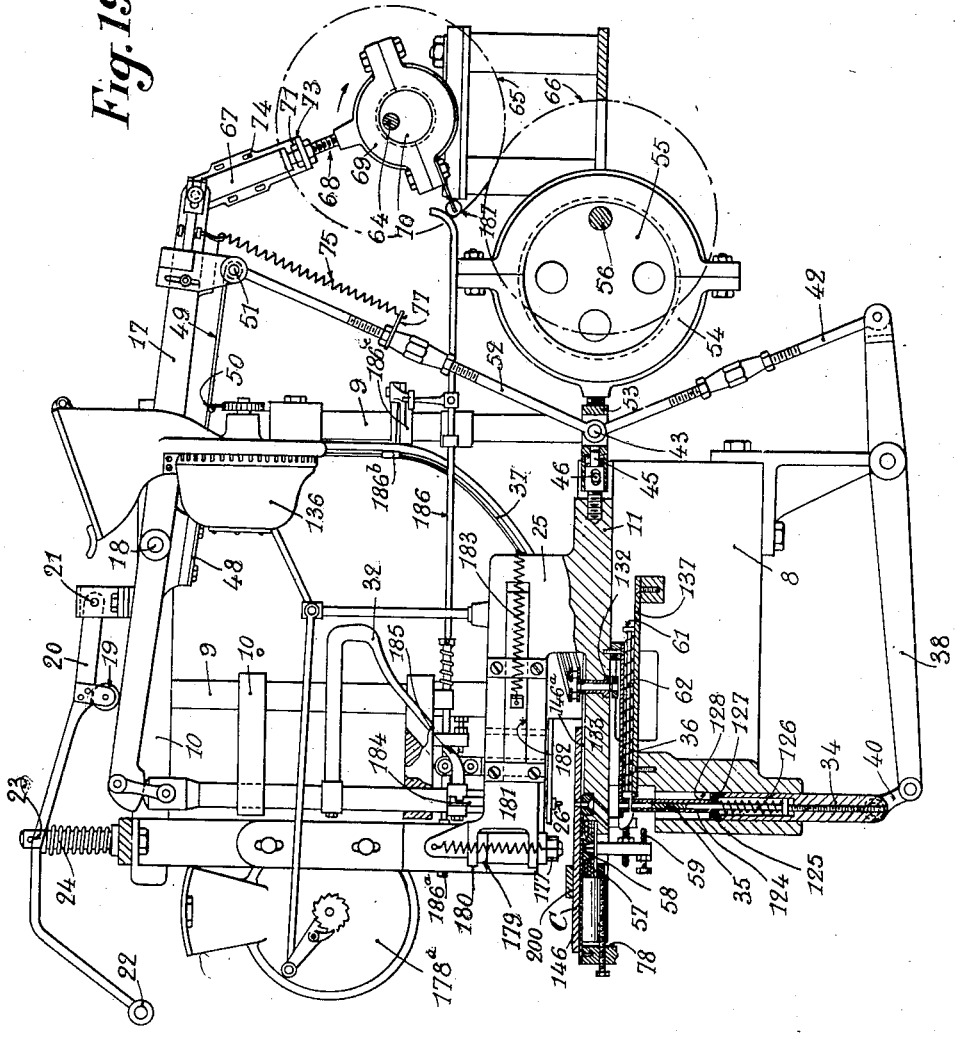

Aug. 7, 1934.        J. GOBIN, DIT DAUDÉ        1,969,214
RIVETING MACHINE
Filed Aug. 15, 1932        7 Sheets-Sheet 7
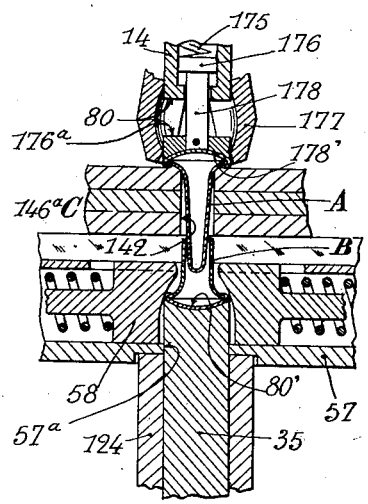
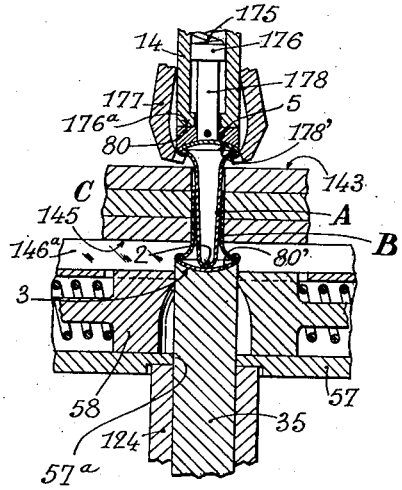
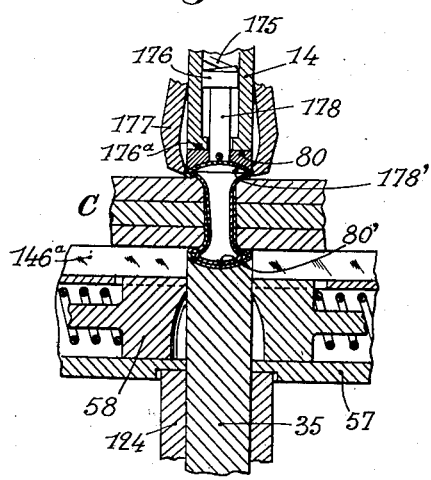
J. Gobin dit Daudé
INVENTOR
By Marks & Clerk
ATTYS.

Patented Aug. 7, 1934

1,969,214

UNITED STATES PATENT OFFICE 1,969,214

RIVETING MACHINE

Jean Gobin, dit Daudé, Combs-La-Ville, France

Application August 15, 1932, Serial No. 628,942
In France August 22, 1931

19 Claims. (Cl. 218—15)

The invention relates to a rivet setting machine adapted to set in a work a rivet made of two elements whose tubular portions are adapted both to enter the hole in the work. My invention is more particularly concerned with the setting of such rivets in machines embodying punching tools adapted to punch out the holes in the work for receiving said rivets.

In order to obtain a reliable assembly by the use of rivets of the proper size and shape, it is necessary that the work should be tightly pressed between the heads of the two rivet elements, after the rivet has been set. This condition has been only imperfectly complied with in the known automatic rivet setting machines adapted to set rivets made in two pieces, in which both the male and the female elements have a tubular stem portion, adapted to enter the hole in the work.

It will be understood that the insertion of the male element into the female element is particularly difficult when the type of rivet in use comprises a tubular male element having an open end which fails to guide the insertion into the female element. For this reason, when the insertion is performed with the known automatic machines, the inner size of the open end of the female male element must somewhat exceed the outer size of the end of the male element (which is to be inserted into the opening of the female element), and this difference of size, which I call "insertion clearance" must be sufficient to provide for the insertion in spite of any lack of alignment between the female and the male elements.

Now, this "insertion clearance" interferes with the condition above mentioned of a tight pressing of the work because the strength of the assembly is due to the deformation (expansion, flaring or folding up) of the end of the male part within the enlarged outer end of the female element, and this deformation should increase the cross-section of the end of the male element to such an extent that the two elements of the rivet can no longer be separated.

It will be appreciated that if the increase in the cross-section of the end of the male element, produced by its deformation subsequent to the setting operation, does not exceed the "insertion clearance", the assembly will have no strength. In other words, the riveting will be stronger as the external size of the end of the tubular part of the male element, before it has been subjected to any deformation by pressing, comes nearer the inner size of the female element (which is practically cylindrical).

Since the known machines require a material "insertion clearance" between the two tubular elements of the rivet, they do not provide for the desired strength of the assembly.

The present invention has for its object to improve the construction and the operation of the automatic rivet setting machines, and more specifically to provide means whereby the "insertion clearance" may be reduced to a minimum, in setting two-part rivets in which the male and female elements both comprise a tubular part.

Another condition which should be fulfilled in order to obtain a strong assembly is that the rivet should completely fill the hole in the work so as to prevent sliding of the laminæ of the work. In other words, the case of a laminar work. In other words, the space left between the wall of the hole in the work and the male element should be just equal to the thickness of the cylindrical stem of the female element and it is evident that this condition makes the proper setting still more difficult, since the least lack of centering between the hole in the work and the female element would cause the latter to be crushed against the work instead of being forced through the hole. Whereas setting of buttons requires no special care, since the button element does not enter the hole in the work, it will be seen that setting of rivets properly so-called requires special implements to secure a reliable centering of the female element.

A further object of the invention is accordingly to provide means for centering the female element relatively to the hole in the work. More specifically, the invention has for its object to provide means for centering the male element with respect to the hole in the work and means whereby said male element in turn serves to guide or center said female element during insertion.

Further objects of the invention will be apparent from the following description, in which I have disclosed two embodiments of the invention.

In the accompanying drawings which are given solely by way of example.

Figs. 1 to 8 represent various types of rivets, in axial section, before and after the pressing operation, said rivets being adapted for use with the machine according to the invention.

Fig. 9 is an elevational view of the machine.

Fig. 10 is a partial elevational view on a larger scale, showing the mechanism for the control of the movable table, the punching device and the rivet feeding device.

Fig. 19 shows a modified machine, chiefly adapted to set the rivet represented in Figs. 5 and 6.

Figs. 20, 21 and 22 are vertical sections through the rivet setting members of this machine, showing different steps of the setting operation.

Figure 11:
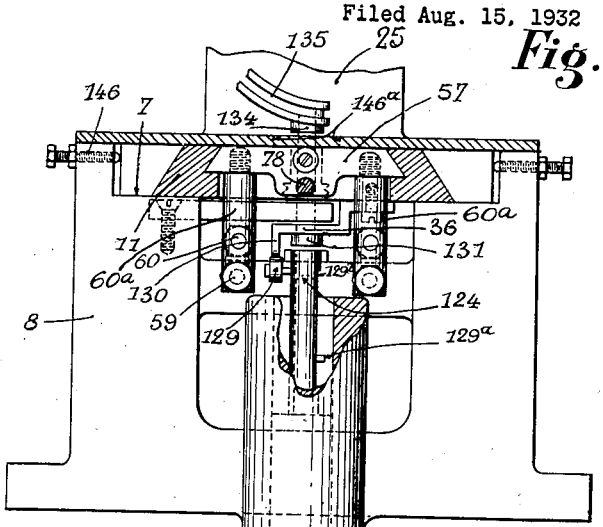
Fig. 11 is a section on the line 11—11 of Fig. 10, the work being removed.

Examples of various types of rivets to which the invention is applicable

The invention is applicable to all types of two-part tubular rivets, comprising a male element A and a female element B. Various types of rivets are shown by way of example in Figs. 1 to 8.

In Figs. 1 and 2, the tubular male element A is open at both ends 1 and 2, and the edge of the open inner end 2a forms an annular face, perpendicular to the axis of the element. The female element B has clenched thereto a solid cap 3, curved inwardly.

In the case of Figs. 3 and 4, the male element A is open at both ends 1 and 2, but the wall surrounding the open end 2a has a smaller diameter than in the preceding case, and possesses a slight taper; the concave cap 3 of the female element B is pierced at its centre at 4.

In the example shown in Figs. 5 and 6, the male element A is closed at its inner end 2, which is to be deformed in the setting operation, and its large end 1 is provided with a cap 5; the female element B is provided with a cap 3, curved outwardly.

The rivet represented in Figs. 7 and 8 consists of a male element A which is deprived of cap and is closed at its inner end 2, and of a female element B provided with a convex cap 3.

In all cases, the caps are not essential and the rivet elements may be reduced to a tubular part, thus having the appearance of an ordinary eyelet.

General considerations about the setting of two-part rivets

The following considerations relate to the rivet shown in Figs. 1 and 2 but they also apply to the other rivets, subject to obvious slight differences.

In the first place, the insertion of the end of the male element A into the tubular stem of the female element is particularly difficult when the edge of the male element A, around the opening 2a, is substantially perpendicular to the axis, thus forming a flat annular surface or shoulder against which the open end 6 of the female element may strike, if during the insertion this female element is slightly out of alignment with the male element and if the "insertion clearance" is strictly reduced to the extent compatible with a strong assembly. In order to prevent the edges 2 and 6 from meeting together without increasing the "insertion clearance", the invention comprises the provision of a special mandrel or guide, having the shape of a round shank provided at the lower end with an enlarged head, preferably adapted for elastic radial compression and adapted to be threaded into the male element A which is suitably positioned for the purpose, with its large open end at the top. Said collapsible head is adapted to yield when threaded through the male element A, and to resume its initial size when issuing therefrom, thus concealing the edge of the male element, forming a shoulder around the shank of the mandrel, which engages without clearance the open end 2a of element A. Said male element A is then maintained in contact with said enlarged head during the insertion step of the setting operation by means of a plunger slidably engaging the shank of the mandrel.

Due to the provision of the mandrel with its enlarged head, all difficulties during the insertion step are obviated, since the internal wall of the open end 6 of the female element B will readily slide upon the tapered lower surface of said enlarged head, notwithstanding a slight lack of alignment and a small "insertion clearance". In addition to its centering function, the mandrel further serves as a feeding member, thereby permitting of materially simplifying the feeding arrangement, and in particular of eliminating the usual upper jaws used in the known machines for guiding the male element A of the rivet towards the hole in the piece of work C.

General description of the machine

The machine represented in Figs. 9, 10 and 11 is particularly adapted for setting rivets of the class shown in Figs. 1 and 2 and comprises a main frame consisting for example of a horizontal table 7, which is maintained at the proper height by a fixed base 8, and of a number of uprights 9 which are cross-connected at the upper part by longitudinal bars 10. In the plane of the fixed table 7 is slidably mounted a movable table 11, adapted to travel in a horizontal path, parallel with the longitudinal middle plane of the machine, below a fixed plate 146, adapted to receive the work. Said table 11 carries a die 12, formed at the centre with a vertical hole 13, and adapted to coact with a suitable punching tool.

Above table 11 is mounted a vertical hollow hammer 14, to be further described, which forms one of the setting tools. Said hammer also serves as a guide for a mechanism which cooperates with a feeding arrangement 15 for feeding the male parts A of the rivets. The hammer is slidable in guides 16, mounted on the longitudinal bars 10, and a reciprocating vertical motion is imparted thereto under the action of a substantially horizontal hammer-control lever 17, pivotally mounted on a pivot pin 18, secured to said longitudinal bars. A roller 19, mounted on an arm 20, pivoted to the main frame at 21, may be pressed against lever 17 by movement of a handle 22, located at the end of arm 20. A stop 23 serves to limit the rise of the said arm under the action of a spring 24 in the idle position.

Below hammer 14 is a punching device, mounted on a bracket 25, secured to or integral with movable table 11, and so arranged that the axis of the punch 26 will constantly coincide with the axis of the die hole 13. When movable table 11 assumes the punching position, punch 26 is coaxial with hammer 14. Said punch rests upon the bottom of, and is guided in a vertical sleeve 27, vertically slidable in bracket 25. Sleeve 27 is screwed to a plate 28, secured to rods 29 and 33, vertically guided in bracket 25. The upper end of rod 29 carries two rollers 30—31, mounted on the respective sides of a cam member 32, secured to hammer 14.

A movable anvil-holder 34, coaxial with the hammer 14, is mounted below table 11, and is vertically slidable in the main frame. The anvil 35 is vertically adjustable with reference to anvil-holder 34 and cooperates intermittently with a transporting device 36 for the female elements B of the rivets, which receives said female elements B from a rivet feeding device 37. A lever 38 (Fig. 9), pivoted at 39 to the main frame, is connected at one end to said anvil-holder by means of a shackle 40 and is pivoted at its other end, at 41, to a rod 42 of adjustable length, which is pivoted at 43 to a hollow sliding member 44, engaged by a guide rod 45, screwed in table 11. Said rod is parallel with the direction of motion of said table and is located in the middle longitudinal plane of the machine. A transverse stud 46, secured to sliding member 44, extends through a slot 47 in rod 45. A spring 44a (Fig. 10) is arranged between the inner end of sliding member 44 and a shoulder formed upon rod 45.

To the hammer-control lever 17 is secured at 48 (Fig. 9) a hinged lever 49, (the hinge being shown at 50), to which is pivoted at 51 a rod 52 of adjustable length, and which is pivoted in turn at its lower end at 43 to sliding member 44. A spring 76, attached at 75 to lever 17 and at 77 to rod 52, is adapted to urge the lower face of lever 17 against the end 51 of said rod. Sliding member 44 is pivoted at 43 to a stirrup 53, secured to an eccentric strap 54, surrounding a setting eccentric disc 55, which is loosely mounted on a shaft 56.

Rotation of shaft 56 and of eccentric disc 55 causes the reciprocation of sliding member 44, rod 43 and movable table 11. At the same time, the motion of member 44 toward the right tends to straighten out rods 42 and 52 forming a toggle lever, thus lowering hammer 14 and raising anvil-holder 34. During this movement, spring 24 holds arm 20 in the raised position, out of contact with hammer control lever 17.

The left hand part of movable table 11 is cut out and the lateral dovetailed edges of said cut out part are adapted to slidably guide the frame 57 (Figs. 9, 10 and 11) of lower feeding jaws 58, to be further described. Two rods 60 are secured to depending studs 60a at either side of said frame 57. The head 61 of each rod is in contact with a spring 62 surrounding said rod and whose opposite end engages a seat 63, mounted on movable table 11. Springs 62 urge frame 57 in contact with the end 11a of movable table 11. Studs 60a respectively carry adjustable stops 59 adapted to engage the stationary base 8 when table 11 moves toward the right.

Stops 59, seats 63, rods 60 and springs 62 are symmetrically arranged with respect to the middle longitudinal plane of the machine (Fig. 11).

The bottom plate of frame 57 is formed on the axis X—X of said jaws with a round hole 57a (Fig. 10), whose diameter slightly exceeds the diameter of anvil 35.

With table 11 in its outermost position toward the left, the position of frame 57 is such that the distance between the axis X—X of jaws 58 and the axis of die 12 (which then coincides with the axis Y—Y of the anvil 35—Fig. 10) is smaller than the eccentricity of eccentric disc 55.

The machine as hereinbefore described is preferably provided with an automatic control embodying an electric motor. The main driving shaft 64 of the machine (Fig. 9) drives the counter-shaft 56 by means of gear wheels 65—66, said shaft 56 loosely carrying eccentric disc 55, as above explained. Disc 55 is connected with shaft 56 by a clutch device adapted for automatic unclutching and stopping of eccentric disc 55 when the latter has rotated through a single revolution, corresponding to a single reciprocation of table 11. This clutch device does not form part of the invention and is of any conventional form. One form of clutch of this class is disclosed in my co-pending patent application Serial No. 529,814, filed April 13, 1931.

Lever 17 may be manually controlled by handle 22, but I prefer to provide an automatic control, which however does not form part of the present invention. For this purpose, the right-hand end of lever 17 (Fig. 9) is pivoted to a hollow slide member 67, engaged by a rod 68, secured to an eccentric strap 69, cooperating with a punching eccentric disc 70, which is loose on shaft 64. To rod 68 is secured, by nuts 71—72, a right-angled guide member 73, carrying studs 74 adapted to guide the slide member 67, whose lower face may engage the top of the nut 71. This mechanism is more fully disclosed in my co-pending patent application No. 529,814 above referred to. Eccentric disc 70 is connected with shaft 64 by a clutch device adapted for automatic unclutching and stopping of eccentric disc 70 when the latter has rotated through a single revolution. This clutch device may be of the kind disclosed in my copending patent application Serial No. 529,814 above referred to.

General operation of the machine

Movable table 11 being in the position of Fig. 9, the work C, which is to be riveted, is laid on plate 146 and properly located with reference to punch 26; for this purpose, punch 26 is lowered by means of handle 22, through the medium of hammer 14. In this manner, the point of the work C where the first hole is to be punched out may be brought exactly below punch 26. When the work has been properly positioned upon plate 146, it is held in place by means of a suitable presser foot 200 of any known construction. Punching eccentric 70 is then clutched to shaft 64, whereby nut 71 engages slide member 67 and imparts thereto an upward thrust, thus rotating lever 17 and lowering hammer 14. Cam member 32 depresses the lower roller 30, together with rod 29, plate 28 and punch 26. Punch 26 soon engages the work C, rises within guide sleeve 27 and remains stationary until it is pressed down through the work by the lower end 80 of hammer 14 (Fig. 10). Punch 26 thus punches out a hole 142 in work C, and forces the punched out disc of material through the hole 13 of the die, which is coaxial with guide sleeve 27. Eccentric 70 (Fig. 9) still rotating, hammer 14 is raised to its idle position by return spring 75. Eccentric 70 is stopped at the end of a revolution by the automatic clutch above referred to.

If, for any reason, punch 26 should be jammed in the hole 142 of work C, member 32 would raise the upper roller 31 of rod 29, and hence plate 28 and punch 26, during the rise of hammer 14, plate 28 remaining suspended from member 32 by means of rod 29.

When eccentric disc 70 has performed one revolution, eccentric disc 55 is started and rotated through one revolution. In the first half revolution of said disc, hammer 14 is lowered and anvil-holder 34 is raised, together with anvil 35, and at the same time slide-block 44 is moved to the right together with movable table 11, by means of stud 46 and rod 45. Before the table has reached the end of this inward stroke, the frame 57 of jaws 58 is stopped in the rivet setting position, due to the engagement of stop 59 with base 8, said setting position being reached before the highest part of anvil 35 and of any accessory fitting carried thereby (such as the guide tube 124 to be further described) has reached the level of the lower surface of table 11. In the setting position, the axis X—X (Fig. 10) of jaws 58 coincides with the axis Y—Y of hammer 14 and anvil 35. Frame 57 remains in the setting position during the whole time required for the setting operation, the remainder of the stroke of table 11 being taken up by springs 62. Due to the displacement of table 11, die 12 is moved inwardly below the work C, along a groove 146a which is formed for this purpose in plate 146. Simultaneously, arm 25, secured to table 11, moves above the work, together with punch 26, thus clearing the way to hammer 14 toward the work C.

The shape of member 32 is such that at each instant, during the simultaneous and right angular movements of member 32, which is lowered together with hammer 14, and of arm 25, which moves toward the right, the point of suspension of rod 29 from member 32 will remain at a constant height above the work C, whereby punch 26 will move above the work C, at a constant distance from its upper surface.

During the downward stroke of hammer 14, a mandrel and plunger arrangement, to be further described, has driven a male rivet element A into the hole 142 in the work, and the anvil 35 has risen, bringing with it a female rivet element B, which is supplied by the rivet feeding device 37 through the transporter 36 (to be hereinafter described). Anvil 35 then cooperates with the jaws 58 for guiding said element B unto the lower end of the hole in the work C, after which the rivet setting operation takes place, as hereinafter described.

Upon completion of the rivet setting operation, and as the eccentric disc 55 is proceeding on its single revolution, hammer 14 and anvilholder 34 are moved away from the work C, whilst slide-block 44 moves to the left, thus causing the return or outward stroke of table 11. When part 11a of table 11 meets the frame 57 of jaws 58, it moves these latter to the left, anvil 35 being then disengaged therefrom. An adjustable screw stop 78, mounted on fixed base 8, engages frame 57 at the end of its outward stroke (Fig. 10), and table 11 is thus stopped by the contact of its part 11a with frame 57, which is now held stationary by stop 78. Any slight excess of stroke of slide-block 44 over the stroke of table 11, thus limited by stop 78, will be taken up by spring 44a. Adjustment of stop 78 will bring the axis of the punching tools in coincidence with the axis Y—Y of the hammer.

It will be understood from the above description that the machine is adapted in the first place to punch out in the work C a hole 142 for receiving the rivet, and then, without displacing the work C, to set a rivet into said hole, exactly in line with the axis of said hole.

Improved rivet setting device

Figure 12:
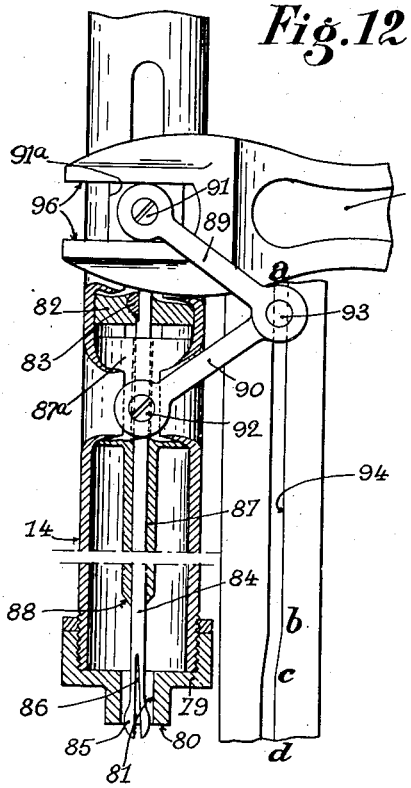
Fig. 12 is an elevational view, with parts broken away, showing the hammer, the plunger and the male rivet guide or mandrel.
Figure 13:
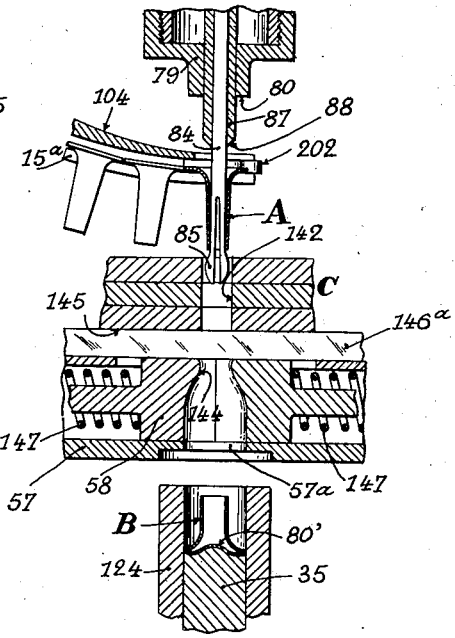

The main feature of the invention resides in the rivet setting device, which is more fully disclosed in Figs. 11 to 13. This device comprises an upper unit which is located above table 7 and is adapted to feed the male elements A one by one, and to insert said rivet elements into the holes punched out in the work, and a lower unit, located below said table and adapted to separately feed and set the female rivet elements B.

The upper unit comprises the hammer 14, above mentioned, which consists of a hollow cylinder (Fig. 12) closed at the bottom by a cap 79, forming a setting tool, whose pressing face 80 has a suitable shape and is pierced with an axial aperture 81.

Within said hammer is slidably guided a mandrel-carrying piston 82 in which is secured at 83 a long rod 84, forming the mandrel, which is coaxial with hammer 14. At its lower end, mandrel 84 is formed with an enlarged head 85, which is adapted for elastic radial compression, for instance by reason of two right-angular diametrical slots.

The transverse size of mandrel 84, in its shank portion, above head 85, is at the maximum equal to the inner transverse size of the male tubular elements A, at their open end 2a (Fig. 1). The transverse size of head 85 (Fig. 12), in its largest cross-section and when in the idle or uncompressed condition, is at least equal to the external transverse size of said male element at its open end 2a, but, in the compressed or collapsed condition, the transverse size of said head is at the maximum equal to the inner size of said male element at its open end 2a.

On mandrel rod 84 is slidably mounted a hollow plunger 87, having a piston-like enlargement 87a. The lower end of said plunger is tapered and forms an annular backing surface 88 for the male rivet elements A. The inner diameter of said annular surface is substantially equal to the diameter of rod 84 and its outer diameter is substantially equal to the diameter of the male element A along the circumference where the annular flange 1 of said element meets the tapered tubular part thereof (Fig. 1). It will be seen that mandrel 84 and plunger 87 may project through opening 81, and that the pressing surfaces 80 and 88 may engage the end 1 of a rivet element A, surface 80 engaging the annular flat flange thereof, in order to perform the rivet setting operation, while surface 88 fills up the funnel-shaped connecting portion between said flange and the tubular stem.

Mandrel 84 and plunger 87 are reciprocated according to the axis of hammer 14 by means of a toggle lever, comprising arms 89, 90 (Fig. 12) whose outer ends are pivoted at 91 and 92 upon pistons 82 and 87a respectively, and whose inner ends are pivotally connected by a stud 93, which is movable in a stationary cam-groove 94, having a straight portion a—b, parallel with the common axis of mandrel 84 and hammer 14, an inwardly deflected curved portion b c, and a second straight portion c d, parallel with said axis.

Mandrel 84 is lowered by a suitable device, to be further described, at a given speed, and, through the toggle lever and cam arrangement, plunger 87 first follows the mandrel at the same speed, and then the speed of the plunger is increased at b c, so that the plunger assumes an advance upon the mandrel, and this advance is preserved till the end of the downward stroke of the mandrel.

Mandrel 84, and hence plunger 87, may be controlled in any suitable manner, subject to the operative conditions previously set forth, i. e. the descent of mandrel 84 and plunger 87 must be much more rapid than the descent of hammer 14 during the first part of the setting stroke, corresponding to the feeding and to the insertion of the male element A into the hole in the work C. This is obtained for instance by means of a lever 95 (Fig. 9) having a forked end 96 cooperating with a block 91a threaded on the pivot pin 91 of piston 82 (Fig. 12), said lever being pivoted on a stationary pivot pin 97 (Fig. 9), and having at its opposite end a stud 98, preferably provided with a roller, and engaging a cam-groove 99, formed in a disc 100, rigidly secured to eccentric disc 55, thus affording a positive control.

The upper rivet setting unit is associated with a feeding device for the male rivet elements A. In the construction herein represented, use is made of an oscillating feeding device of conventional form, consisting of a rotatable box 101, which is operated by a moving part of the machine through a ratchet device 102 as is well known in the art. The rivet elements contained in said box are delivered into the feed channel 15a of said feeding device 15 through notches 103 provided in its periphery. Said channel 15a consists of a grooved member secured to a backing plate 104, integral with the bearing 105 of the shaft 106 upon which box 101 is rotatable; said bearing is pivoted in turn on a stationary stud 107 mounted on the main frame.

The casing of box 101 carries at the top a filling hopper 108. Pivot pin 107 is so located that the whole feeding device 15 tends to turn about said pin 107 in the direction of the arrow $f^1$ (Fig. 9) under the action of gravity. It is held in the raised position by a tenon 109 mounted on hopper 108 and engaging a stationary elastic clamp 110 or the like. Tenon 109 may be released from clamp 110 by means of a device comprising a bar 111, secured to hopper 108, and downwardly bent at its end 112, in the path of a roller 113, mounted at the end of a bell-crank lever 114, pivoted on a fixed pin 115, the remote end of said lever being located in the path of a roller 116 operatively connected with the rod 68 of the punching control. Under the action of said rod, bell-crank lever 114 is tilted by roller 116 in the direction of arrow $f^2$ and roller 113 pushes member 111 outwardly, hence releasing tenon 109 from clamp 110. It will be seen that the feeding device is made free to oscillate in response to the operation of the punching device.

The return stroke toward the raised position of the feeding device 15 is controlled by table 11, during the last part of its stroke to the right, clamping of tenon 109 occurring for the right hand end position of table 11. For this purpose, bracket 25 of table 11 carries an upright 117, which, near the end of its right hand stroke, meets an adjustable stop 118, mounted on a rod 119, which is pivoted at 120 to bar 111 and extends through a block 121 mounted in upright 117 after the manner of a universal joint. Thus, when table 11 is at the end of its stroke to the right, upright 117 brings stop 118 into the position shown in Fig. 9, whereby the feeding device 15 is held in its raised position by the engagement of tenon 109 in clamp 110.

The backing-plate 104 of the channel 15a of the rivet feeding device 15 is provided with a roller 122, arranged laterally of the middle longitudinal plane of the machine and adapted to meet a corresponding face 123 of bracket 25, thus limiting the oscillation of the feeding device in the direction of arrow $f^1$, when said device has been released from clamp 110 in response to the punching operation, as above explained, whilst table 11 is in its punching position (end position to the left). After punching, table 11 moves to the right, toward the setting position, and the feeding device 15 continues to rotate, by its own weight, roller 122 remaining in contact with face 123, until an adjustable stop 201 on the main frame meets the backing plate 104 of channel 15a.

Said stop 201 is so adjusted, account being taken of the shape of the backing-plate, that, when feeding device 15 is stopped by said stop 201, the first male element A, which is contained in the lower end of channel 15a and is held therein by a transverse spring catch 202 (Fig. 10) will have its axis exactly in register with the longitudinal axis of hammer 14 and mandrel 84.

The lower setting unit embodying anvil-holder 34 and anvil 35 (Figs. 9, 10 and 11) further comprises a guide-tube 124 surrounding the top of anvil 35, whose lower threaded part is screwed in the anvil-holder 34, thus affording an adjustment of the position of the top of anvil 35 with reference to said anvil-holder. The internal diameter of guide-tube 124 slightly exceeds the largest diameter of the female element B. Guide-tube 124 has at its lower end a flange 125 in contact with a spring 126 which bears at the other end against a shoulder of anvil 35. Tube 124 is held in place by a cap 127, screwed in anvil-holder 34. This latter is movable in a vertical guide 128, forming part of the fixed base 8.

Guide-tube 124 carries laterally a roller 129 (Fig. 11), which is held in a plane parallel with the plane of Fig. 10 by means of a stud $129^a$, projecting on the side of anvil 35 and slidably engaging a longitudinal slot $129^b$ of guide-tube 124. When adjusting the height of anvil 35, the latter must therefore be screwed either way by a whole number of turns, in order to constantly bring roller 129 into its aforesaid operating plane, since, during the adjustment, guide-tube 124 is rotated together with anvil 35.

Roller 129 cooperates with a cam surface 130 (Fig. 10) which projects laterally at the front end of the horizontal transporting plate 36, secured to the lower side of movable table 11. At its left-hand end, said plate 36 is formed with a short sleeve 131 whose height is at least equal to the height of a female rivet element B and whose internal diameter is equal to that of guide-tube 124. Sleeve 131 is coaxial with guide-tube 124 when movable table 11 assumes the punching position. In this position, sleeve 131 and tube 124 are separated by a very small gap.

A fixed feeding ring 132 is mounted between transporting plate 36 and movable table 11; the distance between the vertical axis of said ring and the axis of anvil 35 is equal to the total stroke of table 11, and said vertical axis of the ring is located in the middle longitudinal plane of the machine.

Above ring 132 is a tube 133, extending through table 11 and said tube 133 is adapted to register with ring 132 when table 11 assumes the punching position. The height of said ring 132 is at least equal to that of a female rivet element B and the internal diameter of ring 132 and tube 133 is equal to that of sleeve 131. When table 11 is in the punching position, tube 133 registers with the outlet 134 of the channel 135 of the female rivet element feeding device 37, which further comprises a rotatable box 136 (Fig. 9) similar to the box 101 of rivet feeding device 15. The size of outlet 134, which is situated adjacent the closed end of channel 135, is just sufficient to allow each rivet element B, when stopped against said closed end, to drop out by gravity, with its axis vertical and the cap 3 (Fig. 1) downwards.

Below transporting plate 36 (Fig. 10) is mounted a stationary horizontal plate or base 137, extending as far as guide-tube 124. The upper surface of said base 137 is situated very slightly below the level of the lower end of sleeve 131 of the plate 36, thus forming a platform for the female rivet element B located in sleeve 131. Similarly, the upper surface of plate 36 forms a platform for the female rivet element B contained in ring 132.

The feeding of rivet elements to channel 135 is controlled by a slide 138 (Fig. 9), mounted on a crank lever 139, pivoted at 140 to the main frame, and pivotally connected at the other end 141 with the releasing lever 114 above described, which is further adapted to release the feeding device 15 from the spring clamp 110, under the action of the automatic punching control.

*Operation of the feeding and rivet setting device*

The movable table 11 being in the position shown in Fig. 9, the punching operation, as above stated, causes the release of the oscillating feeding device 15, and roller 122 engages the face 123 of bracket 25.

Table 11 then moves to the right and the backing plate 104 of feeding device 15 tilts by gravity and engages fixed stop 201. When table 11 assumes the rivet setting position, the first male element A which is contained in channel 15a adjacent elastic catch 202 is so located that its axis coincides with the axis of hammer 14 and mandrel 84.

On the other hand, during a preceding punching operation, a female element B, released by slide 138, has run down through channel 135, tube 133 of table 11 and thence into ring 132, in which it is held during the inward stroke of table 11 by the platform constituted by the upper surface of plate 36. When table 11 and transporting plate 36 reach the end of their inward stroke, rivet element B drops into tube 131, in which it is held by the upper surface of plate 137 during the subsequent outward stroke of table 11. It is thus pushed to the left during this outward stroke of movable table 11, and finally drops into guide-tube 124, upon anvil 35, when table 11 again assumes the punching position (Fig. 10). It will be noted that guide-tube 124 is lowered to the proper level by the cam surface 130 of plate 36, cooperating with roller 129 in order to allow sleeve 131 to come over guide-tube 124. During these successive downward movements of female rivet element B, the latter always remains with its heaviest part, i. e. cap 3, at the bottom, and finally rests upon anvil 35 with its open end 6 facing upwardly, even though the total height of this element might be less than the internal diameter of guide-tube 124.

In short, after the punching operation (provided this punching operation is not the first one performed, in which case anvil 35 must be fed beforehand with a female element B by lowering tube 124 by hand), and when movable table 11 has been moved to the setting position, a male element A, carried by channel 15a, is properly placed under hammer 14, and a female element B is properly fitted upon anvil 35 (Fig. 13).

Hammer 14 is then lowered through members 52 and 17, and, under the action of lever 95 and the cam groove 94 (Fig. 12), mandrel 84 and plunger 87 are also lowered but more rapidly than hammer 14 (compare their positions in Figs. 12 and 13).

The elastic or collapsible head 85 of mandrel 84 engages the internal wall of the lowermost male element A located in channel 15a, next to catch 202, and it is progressively collapsed as it enters the tubular stem of said male element and lowers therethrough, the internal cross-section of said stem being progressively smaller by reason of its slight taper from the large end 1 to the open part 2a, the walls of channel 15a taking up the thrust of the mandrel. When the head 85 of the latter issues from the open part 2a, it resumes its normal size. At this instant, channel 15a is moved back (Fig. 14) under the action of parts 25, 117, 121, 118, 119, 111, as above explained. Spring catch 202 yields to the pressure of male element A, which is held by mandrel 84, and again closes the lower end of channel 15a after it is has receded from said male element.

Figure 15:
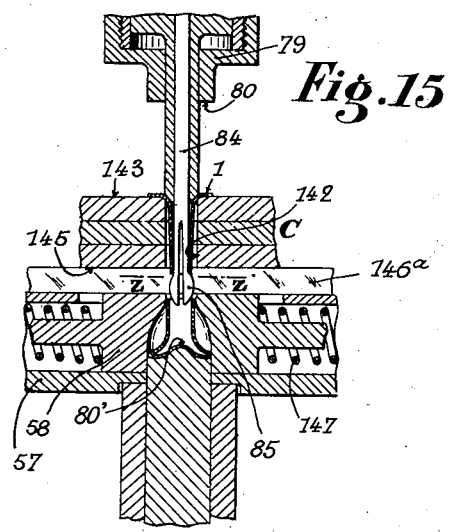

The male element A slides along mandrel 84 by its own weight with its open part 2a resting upon the top of head 85, while the mandrel continues to descend towards the hole 142 in work C. It will be understood however that a downward pressure must be exercised upon male element A, in order to overcome the progressively increasing friction produced by the penetration of its tubular stem into the hole 142 in the work, by reason of the slight taper of this tubular stem, until its flange 1 engages the upper surface 143 of work C (Fig. 15).

Figure 14:
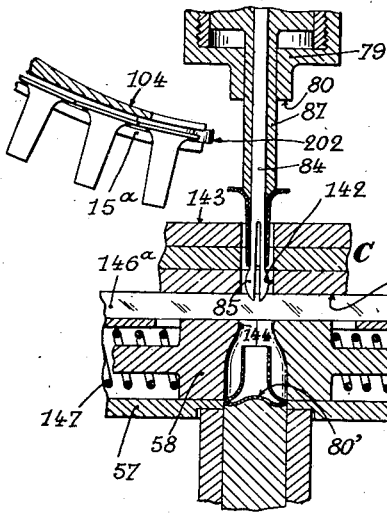

This pressure is produced by plunger 87 which, due to the coaction of cam groove 94 with rods 89 and 90, advances with reference to mandrel 84. The tapered surface 88 of said plunger bears upon male element A shortly after this latter has been pulled out of channel 15a, and it holds the open end 2a of element A against the head 85 of mandrel 84, while said male element is forced into the hole 142 in work C (Fig. 14).

The relative motions of mandrel 84, plunger 87 (both actuated through the medium of lever 95 and cam 99), and hammer 14 (actuated by rod 52 and lever 17) are such that the male element A will have been brought to its fully inserted position (Figs. 15 and 16) before the cap 79 of hammer 14 engages flange 1. The male element A should remain in this position until the female element has been correctly engaged upon the lower end of the male element (compare Figs. 15 and 16). For this purpose, mandrel 84 and plunger 87 remain stationary during this interfitting operation (which lasts but for a short time), owing to a corresponding short curved part 99a of cam groove 99 (Fig. 9).

Before attempting to perform the interfitting of the two elements A and B of the rivet, it is necessary to assure an approximate centering of female element B with respect to the setting tools (which is also the axis of the hole in the work C, since the work is stationary and the setting tools are guided along a stationary vertical axis). Otherwise stated, during the rise of anvil 35, and before the open end 6 of the female element B engages the head 85 of mandrel 84 (Fig. 15), the axis of this female element must be parallel with the axis of the setting tools and as far as possible in coincidence therewith.

This result is obtained by the combination of anvil 35, guide tube 124 and jaws 58 (Figs. 13, 14 and 15); anvil 35 alone enters said jaws as it rises, while guide tube 124 is stopped by frame 57, around hole 57a, thus compressing spring 126 (Fig. 10).

The size of the lower jaws 58 are so related to the size of female element B that the open end 6 of its tubular stem engages the narrow neck 144 of the jaws 58 before the latter open under the pressure of anvil 35.

Thus, when female element B, during its rise under the action of anvil 35, has reached the level corresponding to the beginning of the opening movement of the jaws 58 (Fig. 15), its axis will practically coincide with the axis of the setting tools. At this same time, the open end 6 of female element B is at a short distance from the lower surface 145 of the work C, which is distant from the top of jaws 58 only by the constant thickness of plate 146 (Figs. 9 and 10) whose imperforate part covered said jaws during the punching operation.

This thickness of plate 146 is made sufficient in order to provide for the interfitting of the rivet elements A and B in the empty space corresponding to groove 146a.

Figure 16:
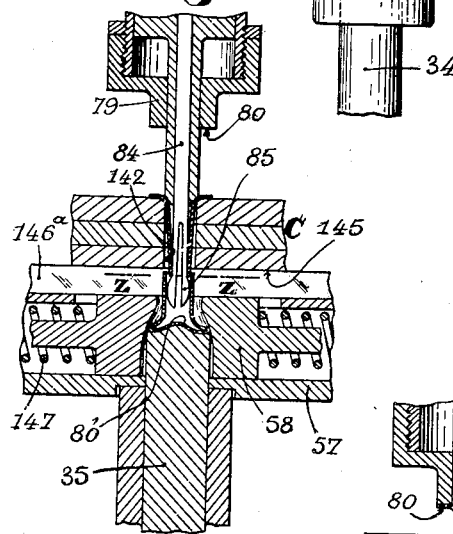
Figs. 13 to 18 are vertical sections through the rivet setting members, showing different steps of the setting operation.

Under the upward thrust of anvil 35, the two jaws 58 move apart against the action of springs 147, and the female element B is guided as it rises by the head 85 of mandrel 84, whose end has entered this element somewhat before jaws 58 have begun to open (Figs. 15 and 16). When the open end 6 of female element B has been engaged upon the open end 2 of male element A, mandrel 84 and plunger 87 will rise together under the action of cam groove 99 and of lever 95, thus raising male element A out of the hole of work C, at a speed which does not exceed the upward speed of female element B, driven by anvil 35.

In the meanwhile, hammer 14 continues to descend and its pressing face 80 engages the flange 1 of male element A. Elements A and B are now in the position shown in Fig. 17. In this position, the pressing surfaces 80 and 80' of hammer 14 and anvil 34 are at distances from the opposite surfaces 143 and 145 of work C, which are proportional to their respective speeds, so that the flanges 1 and 3 of the rivet elements A and B, which are pressed toward each other by said pressing surfaces will engage the work at the same time, thus preventing the work from leaving its supporting surface, which might occur by reason of the upward thrust of the anvil.

Figure 18:
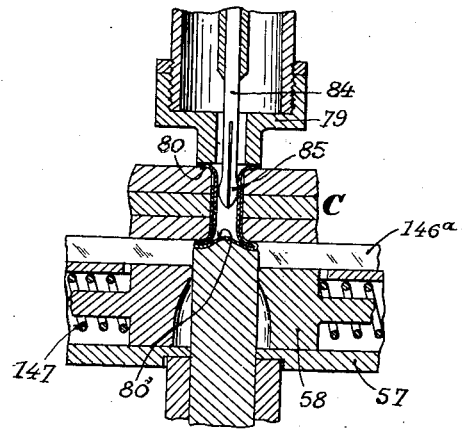
Figure 17:
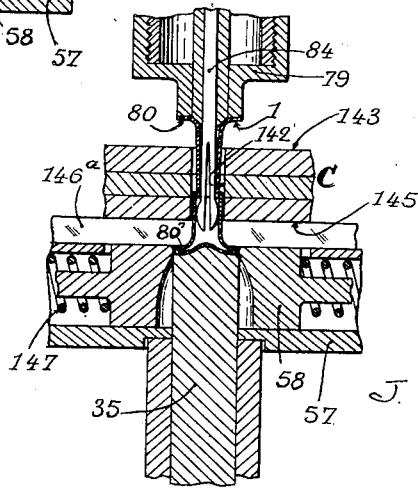

Starting from the position shown in Fig. 17, die 35 and hammer 14 will still move together until the rivet setting operation is completed (Fig. 18), i. e. until the open end 2 of the male element A is expanded, as shown in Fig. 2.

However, mandrel 84 begins to rise before the setting operation is completed, its head 85 being collapsed by the open end 2a of male element A, the resistance of the head to compression being overcome by the operative connections controlling the rise of mandrel 84. In this manner, before the maximum pressure is brought upon the rivet (Fig. 18) mandrel 84 and its head 85 will have been sufficiently withdrawn upwardly to release the lower end 2 of the male element A.

As eccentric disc 55 continues its rotation, limited to one revolution, hammer 14 rises, whilst anvil 35 is lowered, thus allowing the jaws 58 to close. Mandrel 84 and plunger 87 continue to rise, and resume their respective initial positions (Fig. 12).

During the riveting operation, movable table 11, after reaching its right-hand dead centre corresponding to the maximum pressing of the rivet, returns to the left, toward the punching position, and simultaneously provides for the subsequent feeding to anvil 35, for the next rivet setting operation.

Modified construction of the machine

In the form of construction shown in Figs. 19 to 22, and adapted for setting rivets of the type shown in Figs. 5 and 6, feeding of male elements A is effected by means of upper spring jaws 177, of conventional construction. A plunger 178, adapted to work through said jaws 177, is slidably mounted within hammer 14, along its longitudinal axis, and it is urged downwardly by a spring 175, whose force exceeds the axial reaction imparted to the male rivet element A and hence to the plunger 178 by the oblique inner walls of the spring jaws 177.

Jaws 177 are supplied with rivet elements by a stationary rivet feeding device 178a, when table 11 assumes the punching position shown in Fig. 19. Said jaws are mounted on a forked bracket 179, coaxial with a fork 180, carried by a block 181, which is slidably mounted in a guide slot 182 of bracket 25, secured to movable table 11. A spring 183, operating by extension, is attached at one end to block 181 and at the other to bracket 25, whereby the jaws 177 are moved by table 11 at the beginning of its right-hand movement. This right-hand movement of jaws 177 is limited by a rod 184, mounted on block 181 and adapted to engage a fixed adjustable stop 185. Upon engagement of these two members, the vertical axis of jaws 177 coincides with the longitudinal axis of hammer 14 and plunger 178. Spring 183 takes up the remainder of the right-hand stroke of table 11.

The feeding device for the female elements B is similar to the one above described with reference to Fig. 9.

The control of the rivet feed in response to the punching is performed by an axially movable rod 186 actuated by a roller 187, mounted on the strap 69 of the punching eccentric 70. Rod 186 directly operates the distributing slide 186a of the rivet feeding device 178a and it also operates the slide 186b of the feeding device 37, through a bell-crank lever 186c.

The operation is as follows: during the punching operation, plunger 178 is lowered together with hammer 14, but the plunger is stopped when it meets the punch 28, whose head has a shape which is complementary to that of the concave pressing surface 178' of plunger 178 (said pressing surface 178' is adapted to fit upon the convex cap 5 of the rivet element A). The plunger, which is thus momentarily held stationary while hammer 14 continues to descend, compresses spring 175, until it receives the direct pressure of the lower end of hammer 14; the punch is then pressed down through the work.

After the feeding of the upper jaws 177 and of the lower anvil 35 has been performed, during the punching operation, the male and female elements A and B are brought between the setting tools, in register with the hole 142 in the work C, by the rotation of eccentric disc 55.

Hammer 14 is again lowered, but spring 175 which has a suitable force, now withstands the thrust produced by forcing male element A through jaws 177 as well as through the hole in the work C. Spring 175 only yields when the flange 1 of element A engages the work C, hammer 14 still descending (Fig. 20).

After male element A has entered female element B, it receives the thrust of the female element, due to the engagement of its end 2 with cap 3. Element A is thus raised, thus producing an additional compression of spring 175. This upward movement of these parts will continue until plunger 178, which is in contact by its pressing surface 178' with the capped flange of the male element, receives the direct pressure of hammer 14 (Fig. 21). At this time, the pressing surfaces 178' and 80' of plunger 178 and of anvil 35 will be situated at distances from the opposite surfaces 143 and 145 of the work C which are proportional to their respective speeds. The flanges of the rivet elements A and B, which are pressed toward each other by said pressing surfaces, will consequently engage the work C (Fig. 22) at the same time, thus preventing the work from leaving its supporting surface, which might occur by reason of the upward motion of the anvil.

The pressing surface 178' of plunger 178 may have any suitable shape, depending on the shape of rivet element A. In particular, this element may be open at the upper part, and plunger 178 may have a depending projection adapted to enter the stem of element A, for guiding purposes.

Obviously, the invention is not limited to the forms of construction herein described and represented, which are given solely by way of example.

Having now described my invention, what I claim as new and desire to secure by Letters Patent is:

1. In a rivet setting machine adapted to set tubular rivets made in male and female elements, male element feeding means, female element feeding means, a male element setting member embodying a reciprocating hammer, a plunger coaxial with said hammer, a female element reciprocating setting anvil and means timing the movement of said hammer, anvil and plunger whereby said plunger first meets a male element and drives same through the hole of the work with the inner end of said male element projecting from the opposite end of the hole, then the anvil inserts a female element upon said projecting end, whereupon said plunger together with said male element recedes from the work as said anvil still moves toward the work and finally the flanges of said rivet elements are simultaneously pressed by said hammer and anvil against the work.

2. In a rivet setting machine adapted to set tubular rivets made in male and female elements, male element feeding means, female element feeding means, a male element setting member embodying a reciprocating hammer, a plunger coaxial with said hammer and yielding means connecting said hammer with said plunger, a female element reciprocating setting anvil and means timing the movement of said anvil and hammer whereby said plunger first meets a male element and drives same through the hole of the work with its inner end projecting from the opposite end of the hole, then the anvil inserts a female element upon said projecting end, whereupon the flanges of said rivet elements are pressed by said hammer and anvil against the work.

3. In a rivet setting machine adapted to set tubular rivets made in male and female elements, male element feeding means, female element feeding means, a male element setting member embodying a reciprocating hammer, a plunger coaxial with said hammer, a female element reciprocating setting anvil, means for reciprocating said hammer and anvil, and cam operated means for controlling said plunger, whereby the latter has an accelerated motion with respect to said hammer in both directions of motion of the latter, for inserting a male element into the hole of the work and permitting partial retraction of said male element before the latter is engaged by said hammer.

4. In a rivet setting machine adapted to set tubular rivets comprising a tubular male element open at both ends and a tubular female element, male element feeding means, female element feeding means, a male element setting member, a rivet guide coaxial with said setting member, a female element setting anvil and means for timing the movements of said rivet guide, hammer and anvil whereby said rivet guide is first threaded through the male element, then said rivet guide and male element are inserted through the hole of the work with their ends projecting from the opposite end of the hole, then the anvil inserts a female element upon said projecting ends, and finally said rivet guide moves back as said anvil moves toward said hammer to press the flanges of said rivet elements against the work.

5. In a rivet setting machine as claimed in claim 4, a plunger coaxial with said hammer and rivet guide, and means timing the movement of said rivet guide with respect to said hammer, whereby said plunger is adapted to meet a male element threaded on said rivet guide and drive said male element through the hole of the work bodily with said rivet guide, and to recede bodily with said rivet guide upon completion of the insertion of the end of the female element, as said anvil moves toward said hammer.

6. In a rivet setting machine adapted to set tubular rivets made in male and female elements, male element feeding means, female element feeding means, a male element setting member embodying a reciprocating hammer, a rivet guide coaxial with said hammer, a female element reciprocating setting anvil, means for reciprocating said hammer and anvil, and cam operated means for controlling said rivet guide, whereby the latter has an accelerated motion with respect to said hammer in both directions of motion of the latter, said rivet guide being adapted to be threaded through said male element and guide same during insertion through the hole of the work and interfitting with the end of the female element.

7. In a rivet setting machine adapted to set tubular rivets comprising a tubular male element open at both ends and a tubular female element, a hammer, an anvil, means for reciprocating said hammer and anvil toward and away from the work, a rivet guide engageable with the tubular stem of said male element, a plunger engageable with the flange of said male element, and control means for so moving said plunger and rivet guide that the motions of the latter are out of phase and in advance with respect to the motion of said hammer in both directions of reciprocation.

8. A rivet setting machine as claimed in claim 7, wherein said control means comprises a toggle lever connecting said plunger with said rivet guide, cam operated means for controlling one end of said toggle lever, and cam means for guiding the apex of said toggle lever, the outline of said cam means comprising rectilinear portions parallel with the axis of said hammer and a curved part connecting said rectilinear portions.

9. A rivet setting machine as claimed in claim 4, wherein said rivet guide is formed with a collapsible head adapted to move through the tubular stem of a male element in a collapsed condition and to resiliently expand out of said tubular stem.

10. In a rivet setting machine as claimed in claim 4, guiding means associated with said female element setting anvil for substantially centering the female element with respect to said rivet guide.

11. In a rivet setting machine, a fixed frame, a movable frame, a reciprocating hammer guided in said fixed frame, a punch and a die carried by said movable frame, setting tools embodying a reciprocating rivet guide coaxial with said hammer and a reciprocating anvil opposite said hammer, control means for the machine, rivet element feeding means embodying an oscillating channel, means whereby movement of said control means oscillates said channel from a retracted position in which said punch and die register with said hammer for punching purposes, to a working position wherein said hammer, rivet guide and anvil are coaxial with the outlet of said channel, said punch and die clearing the way to said hammer, rivet guide and anvil, for setting purposes, whereby said rivet guide engages a rivet element at the outlet of said channel, and complementary rivet element feeding means cooperating with said anvil.

12. A rivet setting machine as claimed in claim 11, wherein said feeding means is loosely pivoted about a horizontal axis and which comprises a fixed stop on said fixed frame adapted to limit the oscillation of said feeding means toward its working position, clamping means for holding said feeding means in its retracted position, and releasing means adapted to release said clamping means.

13. A rivet setting machine as claimed in claim 11, wherein said setting tools further comprise elastic jaws for the complementary rivet elements, means for resiliently connecting said jaws with said movable frame, and stop means in the path of said jaws for stopping the latter in line with said hammer and in the stroke of said movable frame from the punching position to the setting position.

14. A rivet setting machine as claimed in claim 11, wherein said setting tools further comprise elastic jaws for the complementary rivet elements, means for resiliently connecting said jaws with said movable frame, stop means in the path of said jaws for stopping the latter in line with said hammer, and in the stroke of said movable frame from the punching position to the setting position, a resilient guide tube resiliently connected with said anvil and adapted to intermittently cooperate with said complementary rivet element feeding means for receiving a complementary rivet element, said guide tube being further adapted to engage said elastic jaws in the setting movement of said anvil and to guide said complementary rivet element into said jaws in the further setting movement of said anvil.

15. In a rivet setting machine, a stationary frame, a movable frame, punching tools carried by and having parts axially guided in said movable frame, setting tools embodying a rivet set guided in said stationary frame, and rivet guiding means yieldingly carried by said movable frame, means for holding the work in a fixed position on said stationary frame, means for actuating said movable frame, means for actuating said tools, connecting and timing means for said actuating means, whereby said movable frame is moved relatively to the work to bring the axis of said punching tools in line with the axis of said rivet set in the punching position of said movable frame and to clear the way to said rivet set in the setting position of said movable frame, and stop means for stopping said rivet guiding means in the axis of said rivet set before the end of the setting stroke of said movable frame, whereby said rivet guiding means is held in the setting position during the whole time of the setting operation.

16. In a rivet setting machine, an upper rivet feeding device comprising a male rivet element feeding hopper, a movable feeding channel supplied by said hopper, a reciprocable rivet guide adapted to be threaded into a male rivet element at the end of said channel, said rivet guide having a radially collapsible round head so as to hold said male rivet element against the action of gravity, and means for retracting said channel to clear the way to said rivet guide in the downward stroke thereof, a lower female rivet feeding device, and means, supplied with female rivet elements from said latter feeding device, for threading a female rivet element upon said round head and the male rivet element held behind the latter.

17. In a rivet setting machine as claimed in claim 16, a reciprocable backing member surrounding said rivet guide to engage the inner portion of the flange of a male rivet element threaded on said rivet guide, means for imparting an accelerated movement to said backing member with respect to said rivet guide in the feeding stroke thereof, and a setting tool, surrounding said backing member, to engage the outer portion of the flange of said male rivet element.

18. An upper rivet feeding device comprising a rivet feeding hopper, a movable feeding channel supplied by said hopper, a reciprocable rivet guide adapted to be threaded into a rivet element at the end of said channel, said rivet guide being radially collapsible so as to hold said rivet element against the action of gravity, means for retracting said channel to clear the way to said rivet guide in the downward stroke thereof, a reciprocable backing member surrounding said rivet guide to engage the flange of a rivet element threaded on said rivet guide, a toggle lever connecting said backing member with said rivet guide, means for moving one end of said toggle lever, and cam means cooperating with the apex of said toggle lever.

19. In a rivet setting machine, a fixed frame, a reciprocable frame, punching tools having reciprocable parts carried by said reciprocable frame, setting tools, a rivet element feeding member, a vertical guide sleeve rigidly carried by said reciprocable frame in the axis of the reciprocable parts of said punching tools, a fixed table in the path of said sleeve to close the bottom thereof except adjacent said setting tools, and means for actuating said reciprocable frame whereby said guide sleeve overlies the lower setting tool at one end of the stroke or punching position of said reciprocable frame and underlies said feeding member at the opposite end or setting position of said reciprocable frame, to receive a rivet element from said feeding member.

JEAN GOBIN, DIT DAUDÉ.